US009410562B2

(12) United States Patent
Besemer et al.

(10) Patent No.: US 9,410,562 B2
(45) Date of Patent: Aug. 9, 2016

(54) HYDRAULIC POWER SYSTEM

(71) Applicant: EATON CORPORATION, Cleveland, OH (US)

(72) Inventors: Scott M. Besemer, Battle Creek, MI (US); Andrew N. Edler, Homer, MI (US); Matthew George Fox, Ceresco, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/852,880

(22) Filed: Sep. 14, 2015

(65) Prior Publication Data

US 2015/0377260 A1 Dec. 31, 2015

Related U.S. Application Data

(63) Continuation of application No. PCT/US2014/027913, filed on Mar. 14, 2014.

(60) Provisional application No. 61/798,893, filed on Mar. 15, 2013.

(51) Int. Cl.
*F16D 31/02* (2006.01)
*F15B 13/044* (2006.01)
(Continued)

(52) U.S. Cl.
CPC ............. *F15B 13/044* (2013.01); *B62D 5/07* (2013.01); *F15B 1/26* (2013.01); *F15B 11/08* (2013.01); *F15B 11/162* (2013.01);
(Continued)

(58) Field of Classification Search
CPC ........ F15B 11/162; F15B 1/26; F15B 13/044; F15B 13/026
See application file for complete search history.

(56) References Cited

U.S. PATENT DOCUMENTS 3,906,727 A 9/1975 Hull
5,881,630 A * 3/1999 Buschur .............. B62D 5/07
60/426

(Continued)

FOREIGN PATENT DOCUMENTS

WO 2010138867 A1 12/2010

OTHER PUBLICATIONS

Korean Intellectual Property Office; International Search Report and Written Opinion in corresponding international application PCT/US2014/027913. Date of Mailing: Aug. 1, 2014.

*Primary Examiner* — Nathaniel Wiehe
*Assistant Examiner* — Daniel Collins
(74) *Attorney, Agent, or Firm* — Dykema Gossett PLLC

(57) ABSTRACT

A hydraulic actuation system includes a differential unit having a hydraulically-actuated differential, a power steering unit, a hydraulic pump, a reservoir, a controller, an electronically-controlled flow control manifold, and a proportional pressure control solenoid valve. A flow control manifold may control fluid flow to the power steering unit and the differential. The manifold may include a manifold inlet connected to a pump; first manifold outlet connected to a differential; second manifold outlet connected to a reservoir; third manifold outlet connected to a power steering unit; two-way solenoid valve connected to a manifold inlet and controlled by a controller; flow control valve connected to a two-way solenoid valve and a first manifold outlet; and a pressure differential sensing valve connected to a two-way solenoid valve, the manifold inlet, and the third manifold outlet. A proportional pressure control solenoid valve may connect the first manifold outlet and the differential.

20 Claims, 5 Drawing Sheets

(51) Int. Cl.
*B62D 5/07* (2006.01)
*F15B 11/16* (2006.01)
*F15B 1/26* (2006.01)
*F15B 11/08* (2006.01)
*F15B 13/02* (2006.01)

(52) U.S. Cl.
CPC ........ *F15B 13/026* (2013.01); *F15B 2211/212* (2013.01); *F15B 2211/40553* (2013.01); *F15B 2211/50563* (2013.01); *F15B 2211/5158* (2013.01); *F15B 2211/7135* (2013.01); *F15B 2211/781* (2013.01)

(56) References Cited

U.S. PATENT DOCUMENTS

| | | | |
|---|---|---|---|
| 6,223,763 B1 * | 5/2001 | Meyer | B62D 5/07 137/118.01 |
| 6,394,558 B2 | 5/2002 | Cords | |
| 6,840,345 B2 | 1/2005 | Ferrari | |
| 2011/0056755 A1 * | 3/2011 | Futahashi | B60K 6/442 180/65.25 |
| 2012/0198832 A1 * | 8/2012 | Fukumoto | F15B 11/162 60/459 |

* cited by examiner

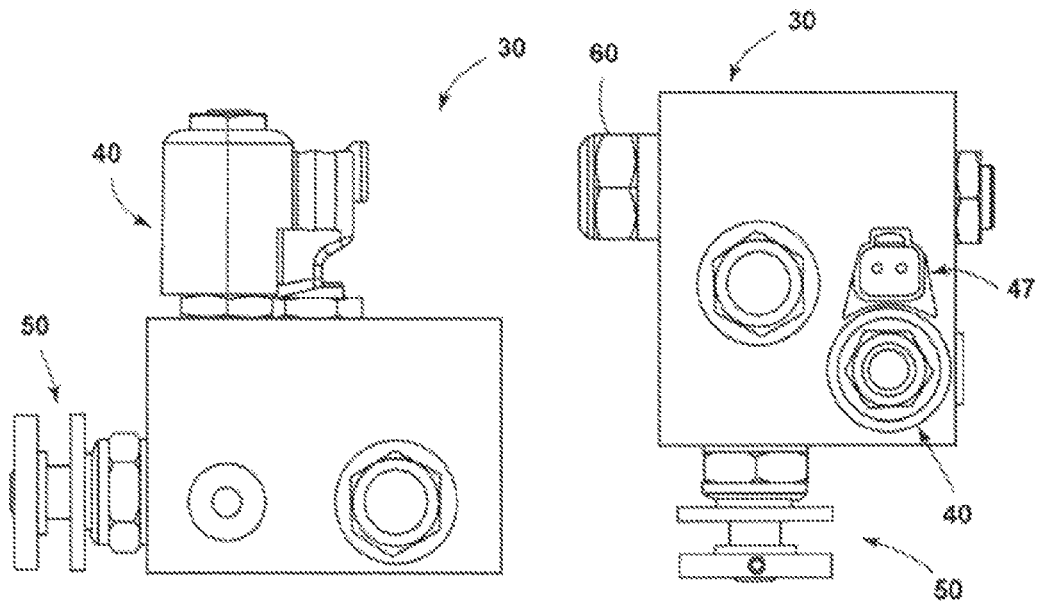
FIG. 2    FIG. 3
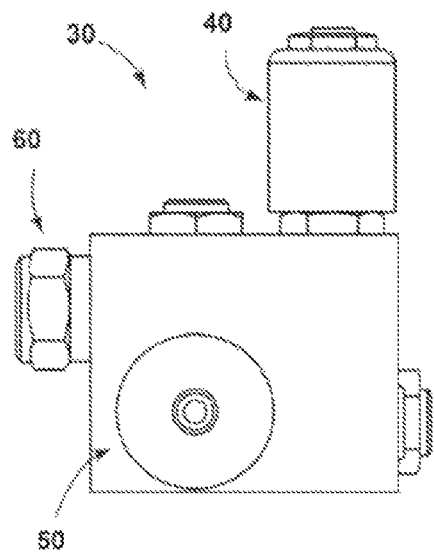    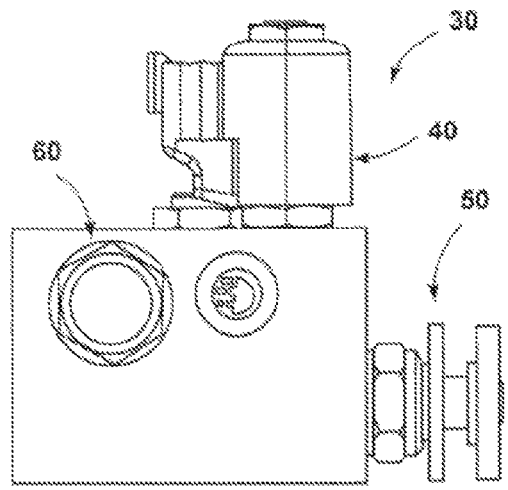
FIG. 4    FIG. 5

HYDRAULIC POWER SYSTEM

CROSS REFERENCE TO RELATED APPLICATION

This application is a continuation of and claims the benefit of PCT Application No. PCT/US2014/027913, filed on Mar. 14, 2014, which claims the benefit of U.S. Provisional Application Ser. No. 61/798,893, filed Mar. 15, 2013, the disclosure of which is incorporated herein by reference in its entirety.

TECHNICAL FIELD

The present disclosure relates to vehicle hydraulic power systems, including hydraulically-actuated differentials.

BACKGROUND

Vehicles often include several hydraulically powered units—i.e., power steering units and differential units. Often, each hydraulically-powered unit includes its own source of fluid and its own pump. However, including such individual pumps and sources of fluid for each hydraulically-powered unit may undesirably increase the weight of the vehicle and reduce efficiency.

SUMMARY

A hydraulic actuation system in accordance with an embodiment of the present disclosure includes a differential unit having a hydraulically-actuated differential, a power steering unit, a hydraulic pump, a reservoir, a controller, an electronically-controlled flow control manifold, and a proportional pressure control solenoid valve. A flow control manifold may control fluid flow to the power steering unit and the differential. The manifold may include a manifold inlet connected to a pump; a first manifold outlet connected to a differential; a second manifold outlet connected to a reservoir; a third manifold outlet connected to a power steering unit; a two-way solenoid valve connected to a manifold inlet and controlled by a controller; a flow control valve connected to a two-way solenoid valve and a first manifold outlet; and a pressure differential sensing valve connected to a two-way solenoid valve, the manifold inlet, and the third manifold outlet. In an embodiment, a proportional pressure control solenoid valve may connect the first manifold outlet and the differential. In an embodiment, a controller may be configured to control fluid flow in the system to prioritize providing fluid flow to the power steering unit relative to providing fluid flow to the differential unit.

Additional disclosures are provided and illustrated in the following sections and associated Figures.

BRIEF DESCRIPTION OF THE DRAWINGS

Embodiments of the disclosed subject matter will now be described, by way of example, with reference to the accompanying drawings, wherein:

FIGS. 2-5 generally illustrate front, top, left, and back views of embodiments of an electronically-controlled flow control manifold in accordance with teachings of this disclosure.

DETAILED DESCRIPTION

Reference will now be made in detail with respect to embodiments of the present disclosure, examples of which are described herein and illustrated in the accompanying drawings. While concepts will be described in conjunction with embodiments, it will be understood that the invention is not intended to be limited to the specific disclosures associated with the embodiments. On the contrary, the invention is intended to cover alternatives, modifications and equivalents, which may be included within the spirit and scope of the invention as defined by the appended claims.

Figure 1:
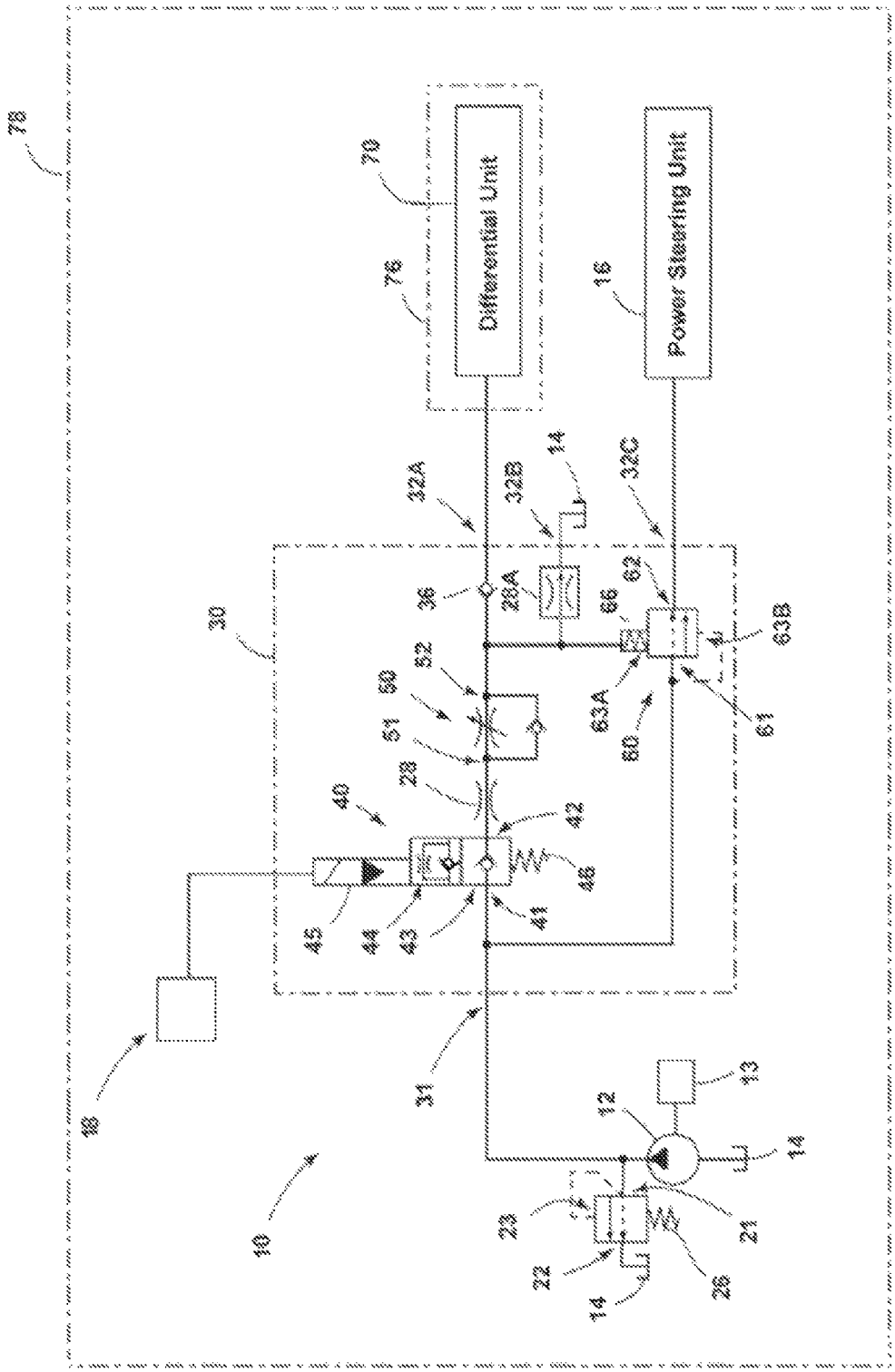
FIG. 1 generally illustrates an embodiment of a hydraulic power system in accordance with teachings of this disclosure.

FIG. 1 generally illustrates a diagram view of an embodiment of a hydraulic power system 10. System 10 may be configured to control pressurized fluid flow to and/or between both a power steering unit 16 and a differential unit 70. For example, and without limitation, system 10 may be configured to prioritize fluid demands of power steering unit 16 over fluid demands of differential unit 70.

In an embodiment, system 10 may include a pump 12, a reservoir 14, a relief valve 20, an electronically-controlled flow control manifold 30, a power steering unit 16, a differential unit 70, and/or an electronic control unit (ECU) 18.

A pump 12 may, for example, comprise a hydraulic pump. Pump 12 may be unidirectional or bidirectional, and may provide fixed displacement and/or variable displacement. The pump 12 may be coupled to a pump driver 13, which may comprise an electric motor and/or a vehicle engine. For example, and without limitation, pump 12 may be coupled with a serpentine belt of a vehicle 78. Pump 12 may be connected to reservoir 14 and may be configured to provide fluid from reservoir 14 to electronically-controlled flow control manifold 30. Pump 12 may be included in power steering unit 16.

A reservoir 14 may be configured to at least temporarily store fluid, and may, without limitation, include a tank and/or sump. The reservoir 14 may be configured to provide a source of fluid for system 10. Reservoir 14 may, additionally or alternatively, be configured to receive return fluid associated with system 10.

System 10 may include at least one relief valve 20. In an embodiment, relief valve 20 may be disposed or connected between pump 12 and electronically-controlled flow control manifold 30. Relief valve 20 may include an inlet 21, an outlet 22, and/or a sensing port 23. Relief valve inlet 21 may be connected to pump 12, and relief valve outlet 22 may be connected to reservoir 14. Relief valve may have a first position which may correspond to relief valve 20 preventing fluid flow from relief valve inlet 21 to relief valve outlet 22. Relief valve 20 may include a second position, generally shown in phantom, which may correspond to relief valve 20 permitting fluid flow from relief valve inlet 21 to relief valve outlet 22. In an embodiment, relief valve 20 may be configured to transition between its first and second positions according to a fluid pressure at relief valve inlet 21. For example, and without limitation, relief valve 20 may be configured to transition from the first position to the second position if the fluid pressure at relief valve inlet 21 exceeds a set or threshold pressure. Moreover, relief valve 20 may include a biasing member 26 that may provide a force that, for example, can correspond to a set or threshold pressure.

As generally illustrated in FIGS. 1-4, in an embodiment, system 10 may include an electronically-controlled flow control manifold 30. Manifold 30 may include an inlet 31, a first manifold outlet 32A, a second manifold outlet 32B, and/or a third manifold outlet 32C. In an embodiment, manifold 30 may include a check valve 36, a two-way solenoid control valve 40, an adjustable flow control valve 50, a pressure differential sensing valve 60, and/or at least one fixed restriction 28.

A manifold inlet 31 may be connected to pump 12 and/or relief valve 20, two-way solenoid valve 40, and/or sensing valve 60. First outlet 32A and second outlet 32B may be connected to each other and/or connected to adjustable flow control valve 50. Additionally or alternatively, first manifold outlet 32a may be connected to differential unit 70, and/or second manifold outlet 32B may be connected to reservoir 14. Third manifold outlet 32C may be connected to power steering unit 16 and/or sensing valve outlet 62.

A two-way solenoid control valve 40, which may be referred to as control valve 40, may include an inlet 41, an outlet 42, a solenoid 45, a first portion 43, and/or a second portion 44. Control valve inlet 41 may be connected to manifold inlet 31, sensing valve inlet 61, and/or sensing valve second sensing port 63B. Control valve outlet 42 may be connected to adjustable flow control valve 50. Control valve outlet 42 may be connected to adjustable flow control valve 50 via a fixed restriction 28.

A control valve first portion 43 may correspond to control valve 40 preventing fluid flow from control valve inlet 41 to control valve outlet 42. First portion 43 may, additionally or alternatively, correspond to control valve 40 permitting fluid flow from control valve outlet 42 to control valve inlet 41. Control valve second portion 44 may permit relatively unrestricted fluid flow from control valve inlet 41 to control valve outlet 42. Control valve second portion 44 may, additionally or alternatively, correspond to control valve 40 permitting restricted fluid flow from control valve outlet 42 to control valve inlet 41.

A solenoid 45 may be configured to transition control valve 40 between a first position in which first portion 43 may be connected to inlet 41 and outlet 42, and a second position in which second portion 44 may be connected to inlet 41 and outlet 42. Solenoid 45 may be connected to ECU 18, for example, via connector 47. ECU 18 may be configured to cause control valve solenoid 45 to transition control valve 40 between its first and second positions. Control valve 40 may include a biasing member 46 that may bias control valve 40 toward its first position and/or its second position.

An adjustable flow control valve 50, which may be referred to as flow control valve 50, may include an inlet 51 and an outlet 52. Flow control valve 50 may permit relatively unrestricted fluid flow in a direction from its outlet 52 to its inlet 51. Flow control valve 50 may also permit and/or restrict fluid flow in a direction from its inlet 51 to its outlet 52. The degree to which flow control valve 50 permits and/or restricts flow may be adjustable. Flow control valve 50 may be adjusted manually and/or automatically. Flow control valve may be connected to ECU 18. For example, and without limitation, ECU 18 may be configured to adjust the degree of flow restriction provided by flow control valve 50.

A manifold 30 may include a pressure differential sensing valve 60, which may be referred to as sensing valve 60. Sensing valve 60 may include an inlet 61, an outlet 62, a first sensing port 63A, and/r a second sensing port 63B. First sensing port 63A may be connected to flow control valve outlet 52, first manifold outlet 32A, and/or second manifold outlet 32B. First sensing port 63A may be configured to receive pressurized fluid that may correspond to a fluid pressure of differential unit 70. Second pressure sensing port 63B may be connected to sensing valve inlet 61, manifold inlet 31, and/or control valve inlet 41. Second pressure sensing port 63B may be configured to provide fluid that may be pressurized at a pressure corresponding to a pressure at manifold inlet 41.

A sensing valve 60 may include a first position that may correspond to sensing valve 60 preventing fluid flow in a direction from its inlet 61 to its outlet 62. Sensing valve 60 may include a second position, shown in phantom, that may correspond to sensing valve 60 permitting fluid flow in a direction from its inlet 61 to its outlet 62.

In an embodiment, sensing valve 60 may include a biasing member 66 that may be configured to bias sensing valve 60 toward its first position and/or its second position. Sensing valve biasing member 66 may be configured to provide a biasing force that may correspond to a desired pressure differential between first sensing port 63A and second sensing port 63B. For example, and without limitation, sensing valve biasing member 66 may comprise a spring configured to bias sensing valve 60 toward its first position. If a pressure at second sensing port 63B is sufficiently high, the biasing force of biasing member 66 may be overcome and sensing valve 60 may transition sensing valve 60 from its first position toward its second position.

In an embodiment, manifold 30 may include one or more fixed restrictions 28, 28A. Fixed restrictions 28, 28A may comprise an orifice and/or a pre-set flow regulator. Fixed restrictions 28, 28A may limit the amount of fluid that can flow through them. For example, and without limitation, fixed restriction 28 may comprise an orifice and may be connected and/or disposed between two-way solenoid valve 40 and flow control valve 50, and fixed restriction 28A may comprise a pre-set flow regulator may be connected and/or disposed between flow control valve 50 and reservoir 14.

System 10 may include a power steering unit 16. Power steering unit 16 may be configured to be disposed in a vehicle. Power steering unit 16 may be configured to generate a force to cause a vehicle (e.g., vehicle 78) to turn.

Figure 6:
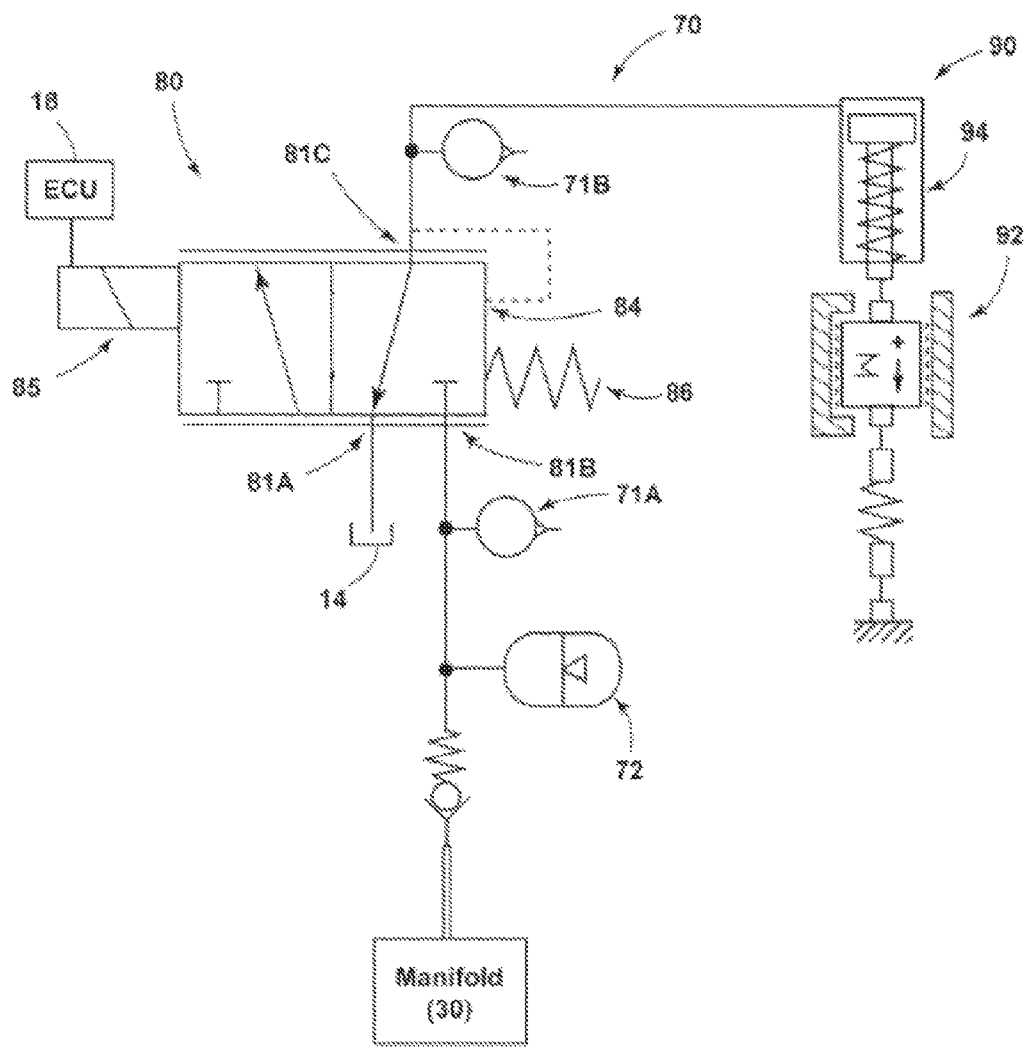
FIG. 6 generally illustrates an embodiment of a differential unit in accordance with teachings of this disclosure.

As generally illustrated in FIG. 6, in an embodiment, system 10 may include a differential unit 70. Differential unit 70 may include a first pressure sensor 71A, a second pressure sensor 71B, an accumulator 72, a proportional pressure control valve 80, and/or a hydraulically-actuated differential 90. First pressure sensor 71A and/or second pressure sensor 71B may be configured to sense a fluid pressure. Pressure sensors 71A, 71B may include pressure transducers. First pressure sensor 71A may be connected between accumulator 72 and proportional pressure control valve 80, and/or may be configured to sense an accumulator pressure. Second pressure sensor 71B may be connected between proportional pressure control valve 80 and hydraulically-actuated differential 90, and/or may be configured to sense a clutch pressure of hydraulically-actuated differential 90. First pressure sensor 71A and/or second pressure sensor 71B may be connected to and/or monitored by ECU 18.

A differential unit 70 may include a proportional pressure control valve 80, which may be referred to as proportional valve 80. Proportional valve 80 may include a first port 81A, a second port 81B, a third port 81C, a first portion 82, a second portion 83, a solenoid 85, and/or a biasing member 86. For example, and without limitation, first port 81A may be connected to reservoir 14, second port 81B may be connected to accumulator 72 and/or manifold 30, and third port 81C may be connected to hydraulically-actuated differential 90.

First portion 82 may correspond to proportional valve 80 permitting fluid flow between first port 81A and third port 81C. First portion 82 may also correspond to proportional valve 80 blocking second port 81B. For example, and without limitation, first position 82 may be configured to permit fluid flow from hydraulically-actuated differential 90 to reservoir 14.

Second portion 83 may correspond to proportional valve 80 permitting flow between second port 81B and third port 81C. Second portion 83 may also correspond to proportional valve 80 blocking first port 81A. For example, and without limitation, second portion 83 may be configured to permit to fluid flow from manifold 30 and/or accumulator 72 to hydraulically-actuated differential 90.

In an embodiment, proportional valve 80 may include a first position in which first portion 82 is connected to first, second, and third ports 81A, 81B, 81C. Proportional valve may also include a second position in which second portion 83 is connected to first, second, and third ports 81A, 81B, 81C.

In an embodiment, differential unit may include an accumulator 72. Accumulator 72 may be connected between manifold 30 and proportional valve 80. Accumulator 72 may be configured to receive and/or at least temporarily store pressurized fluid. Manifold 30 may be configured to provide pressurized fluid to accumulator 72. For example, and without limitation, accumulator 72 may be configured to receive pressurized fluid if it is not desired to provide the pressurized fluid to proportional valve 80, such as if proportional valve 80 is in its first position. Accumulator 72 may be configured to at least temporarily provide a source of fluid to system 10. For example, and without limitation, accumulator 72 may provide pressurized fluid to proportional valve 80 if manifold 30 is not providing a desired amount of pressurized fluid. For example, and without limitation, manifold 30 may not provide a desired amount of pressurized fluid if proportional valve 80 is in its second position, but manifold 30 is directing most or all of the pressurized fluid from pump 12 to power steering unit 16.

Differential unit 70 may include a hydraulically-actuated differential 90. Hydraulically-actuated differential 90 may include at least one clutch pack 92. Clutch pack 92 may comprise a multi-plate wet clutch pack. Differential unit 70 may include one or more actuators 94, which may comprise a cylinder. Actuator 94 may be configured to actuate clutch pack 92. Actuator 94 may be biased by a biasing member 96. Proportional valve 80 may be configured to provide pressurized fluid to actuator 94. Proportional valve 80 may be configured to provide a sufficient amount of pressurized fluid to overcome biasing member 96 and to actuate clutch pack 92. As generally illustrated in FIG. 1, differential unit 70 may be at least partially disposed in a transaxle case 76 of a vehicle 78 that may be a front-wheel drive automobile.

Figure 7:
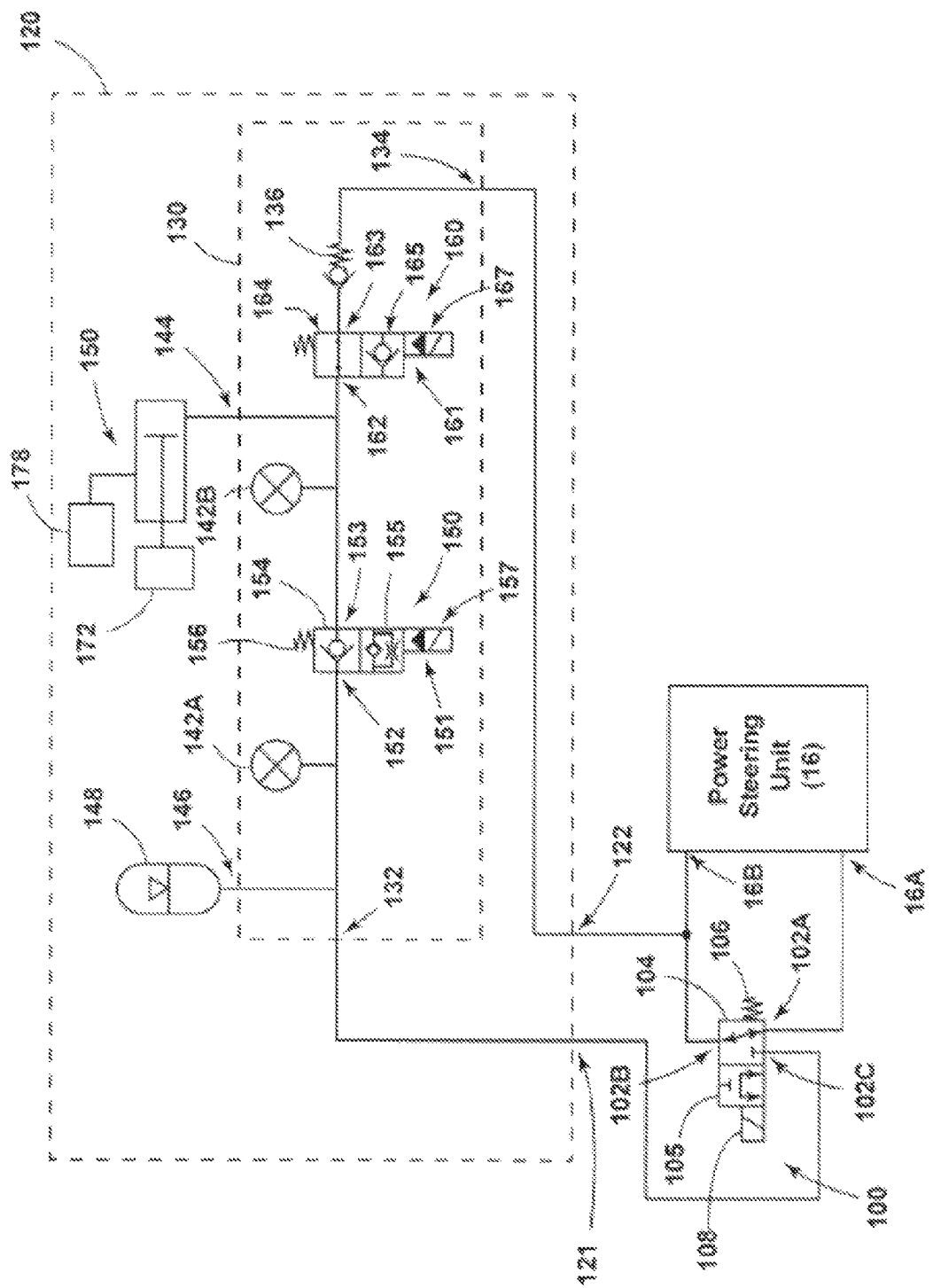
FIG. 7 generally illustrates an embodiment of a hydraulic power system in accordance with teachings of this disclosure.

As generally illustrated in FIG. 7, in an embodiment, system 10 may include a differential unit control valve 100 and a differential unit 120. Differential unit control valve 100, which may be referred to as control valve 100, may be configured to at least partially control fluid flow between power steering unit 16 and differential unit 120. Power steering unit may be configured to provide fluid to control valve 100. ECU 18 may be configured control the amount of fluid power steering unit 16 provides to control valve 100, which may include prioritizing the availability of pressurized fluid for power steering unit 16 relative to the availability of pressurized fluid for control valve 100.

Control valve 100 may include a first control valve port 102A that may be connected to power steering unit outlet 16A, a second control valve port 102B that may be connected to differential unit outlet 122 and/or power steering unit inlet 16B, and a third control valve port 102C that may be connected to differential unit inlet 121. Control valve 100 may include a first portion 104 and a second portion 105. First portion 104 may correspond to control valve 100 permitting fluid flow between its second and third ports 102B, 102C, which may permit fluid flow between differential unit outlet 122 and power steering unit inlet 16A. Second portion 105 may correspond to control valve 100 permitting fluid flow between its first and third ports 101A, 101B, which may permit fluid flow between power steering unit outlet 16B and differential unit inlet 121.

In an embodiment, control valve 100 may include a first position in which first portion 104 is connected to first, second, and third ports 102A, 102B, 102C. Control valve 100 may also include a second position in which second portion 105 is connected to first, second, and third ports 102A, 102B, 102C. Control valve 100 may include a solenoid 108 that may be configured to transition control valve 100 between its first and second positions. Control valve solenoid 108 may be connected to and/or controlled by ECU 18. Control valve 100 may include a biasing member 106 that may bias control valve 100 toward first position 104 and/or second position 105.

Differential unit 120 may include a control manifold 130 and a hydraulically-actuated differential 150. Control manifold 130 may be configured to at least partially control fluid flow to hydraulically-actuated differential 150. Control manifold 130 may include an inlet 132, an outlet 134, a check valve 136, a first control valve 150, a second control valve 160, a first pressure sensor 142A, a second pressure sensor 142B, an actuator port 144, and/or an accumulator port 148. Check valve 136 may permit fluid flow in a direction out of differential unit 120 through outlet 122 and may prevent fluid flow in a direction into differential unit 120 through control manifold outlet 122.

Accumulator port 146 may be connected to control manifold inlet 132 and may be configured to be connected to an accumulator 148. Accumulator 148 may be configured to receive and/or at least temporarily store pressurized fluid. Control valve 100 may be configured to provide pressurized fluid to accumulator 148. For example, and without limitation, accumulator 148 may be configured to receive pressurized fluid if it is not desired to provide the pressurized fluid to first control valve 150. Accumulator 148 may also be configured to at least temporarily provide a source of fluid to system 10. For example, and without limitation, accumulator 148 may provide pressurized fluid to first control valve 150 if control valve 100 is not providing a desired amount of pressurized fluid. For example, and without limitation, control valve 100 may not provide a desired amount of pressurized fluid if control valve 100 directing most or all of the pressurized fluid provided by power steering unit 16 back to power steering unit 16.

First control valve 150 may comprise a two-way solenoid control valve. First control valve 150 may include a solenoid 151, an inlet 152, an outlet 153, a first portion 154, and/or a second portion 155. First control valve inlet 152 may be connected to differential unit inlet 121, first pressure sensor 142A, and/or accumulator 148. First control valve outlet 153 may be connected to actuator port 144, second pressure sensor 142B, and/or second control valve 160.

First portion 154 may correspond to first control valve 150 permitting fluid flow in a direction from its inlet 152 to its outlet 153. First portion 154 may also correspond to first control valve 150 preventing fluid flow in a direction from its outlet 153 to its inlet 152. Second portion 155 may correspond to first control valve 150 permitting fluid flow in a direction from its outlet 153 to its inlet 152. Second portion 155 may also correspond to first control valve 150 allowing restricted fluid flow from its inlet 152 to its outlet 153. First control valve 150 may include a first position in which its first portion 154 is connected to inlet 152 and outlet 153. First control valve 150 may also include a second position in which its second portion 155 is connected to inlet 152 and outlet 153.

Solenoid 151 may be configured to transition first control valve 150 between its first and second position. Solenoid 151 may be connected to ECU 18. ECU 18 may be configured to cause solenoid 151 to transition first control valve 150 between its first and second positions. First control valve 150 may include a biasing member 156 that may bias first control valve 150 toward its first position and/or its second position. First control valve 150 may, additionally or alternatively, be configured to be pilot operated and may include a pilot port 157.

Second control valve 160 may comprise a two-way solenoid control valve and may include a solenoid 161, an inlet 162, an outlet 163, a first portion 164, and/or a second portion 165. Second control valve inlet 162 may be connected to first control valve outlet 163, second pressure sensor 142B, and/or actuator port 144. Second control valve outlet 163 may be connected to control valve second port 102B which may be via check valve 136.

First portion 164 may correspond to second control valve 160 permitting fluid flow between its inlet 162 and its outlet 163. Second portion 165 may correspond to second control valve 160 permitting fluid flow in a direction from its inlet to its outlet. Second control valve second portion 165 may also correspond to second control valve 160 preventing fluid flow in a direction from its outlet 163 to its inlet 162. Second control valve 160 may include a first position in which its first portion 164 is connected to inlet 162 and outlet 163. Second control valve 160 may also include a second position in which its second portion 165 is connected to inlet 162 and outlet 163.

Solenoid 161 may be configured to transition second control valve 160 between its first and second positions. Solenoid 161 may be connected to ECU 18. ECU 18 may be configured to cause second control valve solenoid 161 to transition second control valve 160 between its first and second positions. Second control valve 160 may include a biasing member 166 that may bias second control valve 160 toward its first position 164 and/or its second position 165. Second control valve 160 may, additionally or alternatively, be configured to be pilot operated and may include a pilot port 167.

Differential unit 120 may include a first pressure sensor 142A and a second pressure sensor 142B. Pressure sensors 142A, 142B may be configured to sense a fluid pressure of system 10 and may include pressure transducers. First pressure sensor 142A may be connected between accumulator 148 and first control valve 150 and may be configured to sense an accumulator pressure. Second pressure sensor 142B may be connected between first control valve 150 and hydraulically-actuated differential 170 and may be configured to sense a clutch pressure of hydraulically-actuated differential 170.

Hydraulically-actuated differential 170 may include at least one clutch pack 172. Clutch pack 172 may comprise a multi-plate wet clutch pack. Hydraulically-actuated differential 170 may include at least one actuator 174, which may be connected to actuator port 144. Actuator 174 may comprise a cylinder and/or may be configured to actuate clutch pack 172. Actuator 174 may be biased by a biasing member 176 and/or may be connected to a bleed valve 178. Control manifold 130 may be configured to provide pressurized fluid to actuator 174, which may actuate clutch pack 172. For example, and without limitation, control manifold 130 may be configured to provide an amount of sufficiently pressurized fluid to actuator 174 to overcome biasing member 176 and actuate clutch pack 172.

Figure 8:
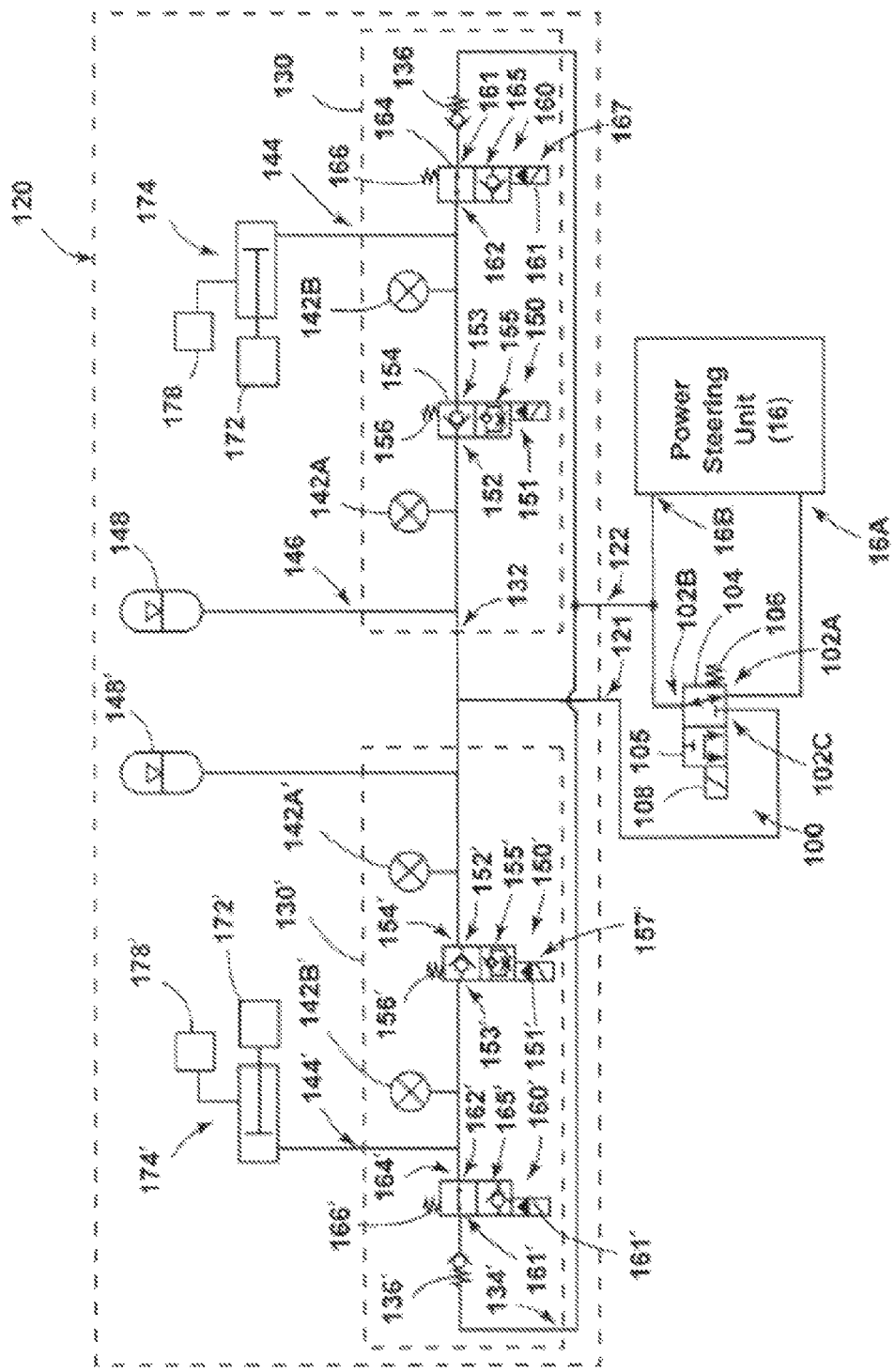
FIG. 8 generally illustrates an embodiment of a hydraulic power system in accordance with teachings of this disclosure.

In an embodiment, hydraulically-actuated differential 170 may comprise more than one actuator, such as actuators 174, 174'. Control manifold 130 may be configured to control fluid flow to both actuators 174, 174' and/or, as generally illustrated in FIG. 8, system 10 may include more than one manifold, such as control manifold 130 and second control manifold 130'. Second control manifold 130' may be configured substantially the same as first control manifold 130, but second control manifold 130' may be configured to control fluid flow to actuator 174'. For example, and without limitation, second control manifold 130' may include an inlet 132', an outlet 134', an accumulator port 146', an actuator port 144', a first control valve 150', a second control valve 160', a check valve 136', accumulator 148', first pressure sensor 142A', and/or second pressure sensor 142B'. Second control manifold 130' may be connected to control manifold 130.

In an embodiment, ECU 18 may comprise a programmable microprocessor and/or microcontroller, and/or may comprise an application specific integrated circuit (ASIC), for example. ECU may include a central processing unit (CPU), memory, and/or an input/output (I/O) interface. ECU 18 may be configured to perform various functions, such as those described in greater detail herein, with appropriate programming instructions and/or code embodied in software, hardware, and/or other medium.

In an embodiment, ECU 18 may be configured to at least partially control the flow of fluid within system 10. For example, and without limitation, ECU 18 may control the flow of fluid between pump 12, power steering unit 16, manifold 30, and differential unit 70. ECU 18 may, without limitation, be connected to manifold 30, power steering unit 16, and/or differential unit 70. ECU 18 may monitor pressure sensor 71A to determine an accumulator pressure of accumulator 72. If the accumulator pressure is below a minimum threshold, such as, without limitation, about 300 psi, ECU 18 may energize solenoid 45 to cause control valve 40 toward shift to its second position. If control valve 40 shifts toward its second position, pressurized fluid from pump 12 may be permitted to flow through fixed restriction 28, flow control valve 50, manifold first outlet 32a, and to differential unit 70. The pressurized fluid may flow to accumulator 72 until a maximum accumulator pressure is reached, such as, without limitation, about 800 psi. ECU 18 may monitor pressure sensor 71A to determine that the maximum accumulator pressure has been reached and may de-energize solenoid 45 to cause control valve 40 to shift toward its first position.

In an embodiment, ECU 18 may be configured to prioritize fluid flow to power steering unit 16 and ensure that power steering unit 16 receives sufficient pressurized fluid from pump 12. Providing sufficient pressurized fluid flow to power steering unit 16 may be desirable to maintain proper functioning of power steering unit 16, which may ensure that a driver of a vehicle 78 is able to drive safely. For example, and without limitation, if control valve 40 is in its first position, fluid is not permitted to flow from pump 12 to differential unit 70 and power steering unit may receive all available fluid from pump 12. If transitioned toward its second position, control valve 40 may allow fluid from pump 12 to be directed to differential unit 70, but the flow may be restricted by fixed orifice 28 and/or flow control valve 50. The flow restriction provided by fixed orifice 28 may limit fluid flow to differential unit 70 to a maximum flow rate. Flow control valve 50 may be configured to further increase the amount of flow restriction between pump 12 and differential unit 70, which may include adjustably limiting fluid flow to a rate below the maximum flow rate. Such flow restrictions may ensure that power steering unit 16 receives sufficient fluid even if control valve 40 is in its second position. Additionally or alternatively, ECU 18 may be configured to determine if power steering unit 16 requires additional fluid and ECU 18 may be configured to energize solenoid 45 to transition control 40 to its first position and prevent fluid flow to differential unit 70.

In an embodiment, ECU 18 may, additionally or alternatively, be connected to differential unit 70. ECU may be connected to first pressure sensor 71A, second pressure sensor 71B, and/or proportional pressure control valve 80. ECU 18 may be configured to energize and/or de-energize solenoid 85, which may cause proportional valve 80 to transition between its first and second positions. For example, and without limitation, if it is desirable to provide fluid to hydraulically-actuated differential 70, ECU 18 may be configured to energize solenoid 85, which may cause proportional valve 80 to transition toward its second position.

In an embodiment, ECU may be connected to first control manifold 130, second control manifold 130', control valve 100, first pressure sensors 142A, 142A', and/or second pressure sensors 142B, 142B'. ECU 18 may be configured to independently and/or collectively energize and/or de-energize one or more of solenoids 108, 151, 151', 161, 161', which may, respectively, cause control valve 100, first control valves 150, 150', and/or second control valves 160, 160' to transition between their respective first and second positions.

It will be appreciated that the above teachings are merely exemplary in nature and is not intended to limit the present teachings, their application or uses. While specific examples have been described in the specification and illustrated in the drawings, it will be understood by those of ordinary skill in the art that various changes may be made and equivalents may be substituted for elements thereof without departing from the scope of the present teachings as defined in the claims. For example, and without limitation, it should be understood references to valves having first and/or second positions are not limited to only having two positions and are also not limited to being in only one position or another. On the contrary, any of the disclosed valves may be configured to be continuous variable between any number of positions the valve may have, which may allow a valve to provide continuously variable openings and/or ports. Moreover, references to valves have specific ports are not so limited. Instead, valves may have any number of ports. Additionally, references to pressure sensor (e.g., pressure sensor 71A and/or 71B) may include pressure transducers and may be connected to and/or monitored by ECU 18.

Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present teachings not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed:

1. A hydraulic actuation system comprising:
    a differential unit including a hydraulically-actuated differential;
    a power steering unit;
    a hydraulic pump;
    a reservoir;
    a controller;
    an electronically-controlled flow control manifold configured to control fluid flow to the power steering unit and the hydraulically-actuated differential, the manifold including
        a manifold inlet connected to the pump,
        a first manifold outlet connected to the hydraulically-actuated differential,
        a second manifold outlet connected to the reservoir,
        a third manifold outlet connected to the power steering unit,
        a two-way solenoid valve connected to the manifold inlet and controlled by the controller,
        a flow control valve connected to the two-way solenoid valve and the first manifold outlet, and
        a pressure differential sensing valve connected to the two-way solenoid valve, the manifold inlet, and the third manifold outlet; and,
    a proportional pressure control solenoid valve connected to the first manifold outlet and the hydraulically-actuated differential.

2. The actuation system of claim 1, wherein the pressure differential sensing valve and the flow control valve are configured to limit fluid flow to the differential unit to a set or predetermined maximum flow rate.

3. The actuation system of claim 1, wherein an outlet of the flow control valve is connected to the first manifold outlet, the second manifold outlet, and the pressure differential sensing valve.

4. The actuation system of claim 1, including an accumulator connected between the first manifold outlet and the proportional pressure control valve.

5. The actuation system of claim 4, including an accumulator pressure sensor connected between the accumulator and the proportional pressure control valve.

6. The actuation system of claim 5, wherein the accumulator pressure sensor is connected to the controller.

7. The actuation system of claim 1, including a clutch pressure sensor connected between the proportional pressure control valve and the hydraulically-actuated differential.

8. The actuation system of claim 7, wherein the clutch pressure sensor is connected to the controller.

9. The actuation system of claim 1, wherein the proportional pressure control valve is controlled by the controller.

10. The actuation system of claim 1, wherein the proportional pressure control valve is a three-way normally closed valve.

11. The actuation system of claim 1, wherein the hydraulically-actuated differential includes a multi-plate wet clutch pack.

12. The actuation system of claim 1, wherein the hydraulically-actuated differential is at least partially disposed in a transaxle case.

13. The actuation system of claim 1, wherein the proportional pressure control valve includes a first position, a second position, a first inlet, a second inlet, and an outlet.

14. The actuation system of claim 13, wherein the first position corresponds to the first inlet being connected to the outlet, and wherein the second position corresponds to the second inlet being connected to the outlet.

15. The actuation system of claim 1, wherein the two-way solenoid valve includes a first position, a second position, an inlet and an outlet.

16. The actuation system of claim 15, wherein the first position corresponds to fluid flow being permitted to flow from the inlet to the outlet, and wherein the second position corresponds to fluid flow being permitted to flow freely from the outlet to the inlet, and being at least partially restricted from flowing from the inlet to the outlet.

17. The actuation system of claim 1, wherein the flow control valve is configured to adjustably control fluid flow from an outlet of the two-way solenoid valve and freely permit fluid flow to the outlet of the two-way solenoid valve.

18. An automobile, comprising:
a hydraulic actuation system comprising:
   a differential unit including a hydraulically-actuated differential;
   a hydraulically-actuated power steering unit in fluid communication with the differential unit;
   a hydraulic pump;
   a hydraulic fluid reservoir;
   a reservoir;
   a controller; and
   an electronically-controlled flow control manifold configured to control fluid flow to the power steering unit and the hydraulically-actuated differential, and
   a proportional pressure control solenoid valve connected to the electronically-controlled flow control manifold and the hydraulically-actuated differential.

19. The automobile of claim 18, wherein the electronically-controlled flow control manifold includes
   a manifold inlet connected to the pump;
   a first manifold outlet connected to the hydraulically-actuated differential;
   a second manifold outlet connected to the reservoir;
   a third manifold outlet connected to the power steering unit;
   a two-way solenoid valve connected to the manifold inlet and controlled by the controller;
   a flow control valve connected to the two-way solenoid valve and the first manifold outlet; and
   a pressure differential sensing valve connected to the two-way solenoid valve, the manifold inlet, and the third manifold outlet.

20. The automobile of claim 18, wherein the automobile is front-wheel drive and the differential unit is at least partially disposed in a transaxle case.

* * * * *